(12) United States Patent
Katta et al.

(10) Patent No.: US 12,744,694 B2
(45) Date of Patent: Sep. 22, 2026

(54) SYSTEMS FOR PROVIDING SYNCHRONIZED FFE IN SERDES TRANSMITTERS

(71) Applicant: SAMSUNG ELECTRONICS CO., LTD., Suwon-si (KR)

(72) Inventors: Umamaheswara Reddy Katta, Bengaluru (IN); Tamal Das, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/966,331

(22) Filed: Dec. 3, 2024

(65) Prior Publication Data

US 2026/0058850 A1 Feb. 26, 2026

(30) Foreign Application Priority Data

Aug. 20, 2024 (IN) ............................. 202441062803

(51) Int. Cl.
*H04L 25/03* (2006.01)

(52) U.S. Cl.
CPC .............................. *H04L 25/03949* (2013.01)

(58) Field of Classification Search
CPC ................................................. H04L 25/03949
See application file for complete search history.

(56) References Cited

U.S. PATENT DOCUMENTS 9,077,574 B1 * 7/2015 Healey .............. H04L 25/03057
9,124,278 B1 * 9/2015 Das ........................ G11C 27/02
9,942,030 B1 4/2018 Dickson et al.
10,560,097 B1 * 2/2020 Peng ....................... H04L 7/033
11,153,129 B1 * 10/2021 Toprak-Deniz ............................. H04L 25/03044
2015/0016497 A1 * 1/2015 Aziz ......................... H04L 7/02 375/233
2020/0084074 A1 * 3/2020 Toprak-Deniz ..... H04L 27/0002
2023/0283283 A1 * 9/2023 Katta ....................... H03K 5/01 327/261
2024/0422458 A1 * 12/2024 Das ..................... H04L 25/4917
2025/0202458 A1 * 6/2025 Valliappan ......... H03H 21/0067
2026/0058850 A1 * 2/2026 Katta ................ H04L 25/03949

FOREIGN PATENT DOCUMENTS

CN 115550116 B 3/2023

OTHER PUBLICATIONS

Xu Bai et al., "A 1.89 mW/Gbps SST transmitter with three-tap FFE and impedance calibration", IEICE Electronics Express, 2019, vol. 16, No. 15, 5 pages, DOI: 10.1587/elex.16.20190356.

* cited by examiner

*Primary Examiner* — Jaison Joseph
(74) *Attorney, Agent, or Firm* — Sughrue Mion, PLLC

(57) ABSTRACT

There is provided a system and a method for filtering out glitches in a SerDes transmitter. The SerDes transmitter includes a latency generation block, and a 2-to-1 serializer. The latency generation block is configured to synchronize a feed forward equalization (FFE) enable signal to a half rate domain by creating a latency in the FFE enable signal, and provide the synchronized FFE enable signal to a plurality of synchronized FFE selection multiplexers. The SerDes transmitter further includes a 2-to-1 serializer that is configured to filter out a glitch using the synchronized FFE enable signal in the half rate domain.

10 Claims, 9 Drawing Sheets

SYSTEMS FOR PROVIDING SYNCHRONIZED FFE IN SERDES TRANSMITTERS

CROSS-REFERENCE TO RELATED APPLICATION

This application is based on and claims priority under 35 U.S.C. § 119 to Indian Patent Application No. 202441062803, filed on Aug. 20, 2024, in the Indian Patent Office, the disclosure of which is incorporated by reference herein in its entirety.

BACKGROUND

The disclosure relates to a serializer/deserializer (SerDes) transmitter, and more particularly to a system and a method for filtering out glitches in SerDes transmitters.

In the field of transistor technology, the size of transistors has been reduced (following Moore's law). However, the size of input/output (IO) pads has not been reduced at the same rate as the decrease in the size of the transistors. As such, there has been an increase in the use of SerDes systems instead of parallel data transmission in IO pads. However, as the data rates continue to increase, coupled with an increase in channel lengths, SerDes systems are faced with new challenges. For example, the channels in the SerDes systems exhibit Low Pass Filters (LPF) characteristics, and as a result, unwanted inter symbol interference (ISI) may occur, which may lead to bit errors or bit failures in a bit stream received at a receiver.

FIG. 1 illustrates an example of channel pulse responses demonstrating ISI caused by future bits and past bits. In related art systems, feed forward equalizer (FFE) may be used in a transmitter (TX) along with a continuous-time liner equalizer (CTLE) and/or a decision feedback equalizer (DFE) in a receiver (RX) to counter a low pass filter (LPF) action of the channel in order to transmit the digital bit stream. The FFE may be generally categorized into a pre-emphasis category (for cancelling ISI caused due to future bits), and a de-emphasis category (for cancelling ISI caused due to past bits). A transmitter of a SerDes system is required to support FFE in order to meet BER along with CTLE and DFE in a receiver of the SerDes system according to standards like MPHY and PCLe. The FFE may be needed only during high speed bursts, and as such, the FFE may be turned ON while entering the high speed burst mode from a non-high speed mode and turned ON while leaving the high speed burst to the non-high speed mode. For example, the non-high speed of FFE may include, but is not limited to, a low speed burst mode, a sleep mode, a stall mode, a hibernate mode etc.

FIG. 2 illustrates an example layout of a transmitter with an FFE enable signal. However, the transmitter illustrated in FIG. 2 does not include an FFE sync feature. Based on the FFE enable signal, the transmitter performs the FFE action by subtracting pre-cursor and/or post-cursor from a main cursor at certain scaling. Here, the pre-cursor is future data, the post-cursor is past data and the main cursor is current data. The FFE action is typically implemented at a full rate data domain. The FFE enable signal comes from a digital bitstream to select any one of the pre-cursor, the main cursor and the post-cursor. This FFE enable signal is usually asynchronous to the pre-cursor, the main cursor and the post-cursor. This will result in a glitch (of magnitude equal to pre/de-emphasis) as shown in example waveforms (b) and (c) in FIG. 3. This may result in false detection in an RX squelch circuit (e.g., a circuit that detects the data transmission on RX pads) whose output is used to turn on high speed circuitry of RX.

Therefore, the FFE enable signal needs to be synchronized with the data domain. However, the synchronization cannot be done in related art SerDes system implementations (as depicted in FIG. 2) as the glitch generated at the FFE selection multiplexer (MUX) cannot be filtered due to non-availability of full rate clocks.

SUMMARY

According to one or more aspect of the disclosure, there is provided a device and method for eliminating glitches in the FFE by moving the FFE enable to half rate data domain so that FFE transition glitch can be filtered at a final 2to1 serializer, creating a latency, which is equal to high speed data, in FFE enable so that FFE is turned ON/OFF exactly at high speed data boundary at TX pads.

One or more aspects of the disclosure relate to an apparatus and a method for eliminating glitches in an FFE by moving the FFE enable signal to a half rate data domain so that FFE transition glitch can be filtered at a final 2-to-1 serializer.

One or more aspects of the disclosure relate to an apparatus and a method for creating a latency in FFE enable so that FFE may be turned ON/OFF exactly at a high speed data boundary at TX pads.

According to an aspect of the disclosure, there is provided a serializer/deserializer (SerDes) transmitter including: a latency generation circuit configured to: synchronize a feed forward equalization (FFE) enable signal to a half rate domain based on a latency in the FFE enable signal, the latency being equal to a latency in a first serializer configured to serialize input data; and provide the synchronized FFE enable signal in the half rate domain to a plurality of synchronized FFE selection multiplexers (MUXes); and a 2-to-1 serializer circuit configured to filter out a glitch using the synchronized FFE enable signal in the half rate domain in the plurality of synchronized FFE selection MUXes based on the synchronized FFE enable signal.

The plurality of synchronized FFE selection MUXes may be configured to select one of a pre-cursor, a main cursor and a post-cursor even and odd data from the input data serialized by the first serializer.

The 2-to-1 serializer may be further configured to: serialize the selected odd and even data; and transmit the serialized data through a transmission pad.

The latency generation circuit may have a same Unit Interval (UI) as the first serializer, and the UI may be implemented using a combination of one or more flip-flops and one or more latches.

The combination of the one or more flip-flops and the one or more latches may be selected based on clock loading and timing closure.

According to another aspect of the disclosure, there is provided a method of filtering out a glitch in a serializer/deserializer (SerDes) transmitter, the method including: synchronizing a feed forward equalization (FFE) enable signal to a half rate domain based on a latency in the FFE enable signal, the latency being equal to a latency in a first serializer configured to serialize input data; providing the synchronized FFE enable signal to a plurality of synchronized FFE selection multiplexers (MUXes); and filtering out a glitch in the plurality of synchronized FFE selection MUXes based on the synchronized FFE enable signal.

The method may further include selecting, by the plurality of synchronized FFE selection MUXes, one of a pre-cursor, a main cursor and a post-cursor even and odd data from the input data serialized by the first serializer.

The filtering out the glitch may include serializing the selected odd and even data; and transmitting the serialized data through a transmission pad.

According to another aspect of the disclosure, there is provided an apparatus including: a first serializer configured to serialize input data; a latency generation circuit configured to output a synchronized feed forward equalization (FFE) enable signal based on a latency in the FFE enable signal; a plurality of synchronized FFE selection multiplexers (MUXes) enabled based on the synchronized FFE enable signal; and a second serializer circuit configured to filter an output of the plurality of synchronized FFE selection MUXes by moving the FFE enable signal to a half rate data domain.

The combination of the one or more flip-flops and the one or more latches is selected based on clock loading and timing closure.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Various changes and modifications may be made within the scope of the embodiments herein without departing from the spirit thereof, and the embodiments herein include all such modifications.

BRIEF DESCRIPTION OF DRAWINGS

Embodiments herein are illustrated in the accompanying drawings, throughout which like reference letters indicate corresponding parts in the various figures. The embodiments herein will be better understood from the following description with reference to the following illustrative drawings. Embodiments herein are illustrated by way of examples in the accompanying drawings, and in which.

DETAILED DESCRIPTION

Figure 1:
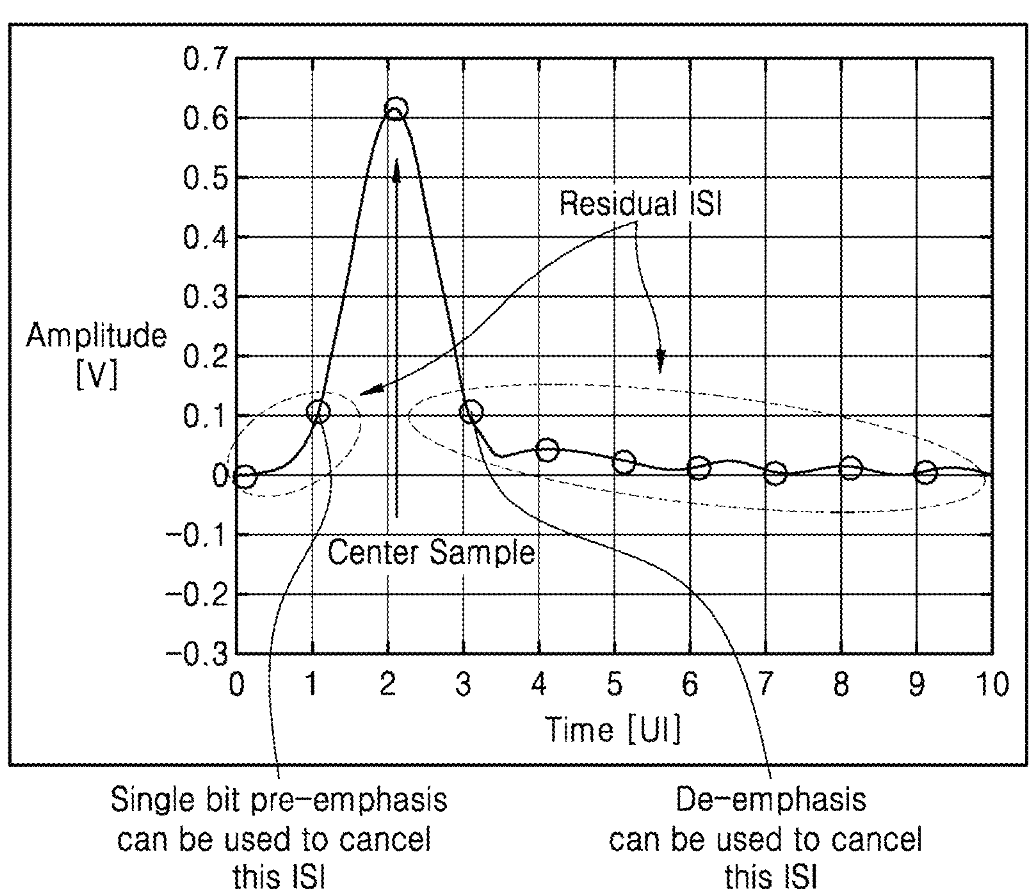
FIG. 1 illustrates channel pulse responses demonstrating ISI caused due to future bits and past bits, according to a comparative example.
Figure 2:
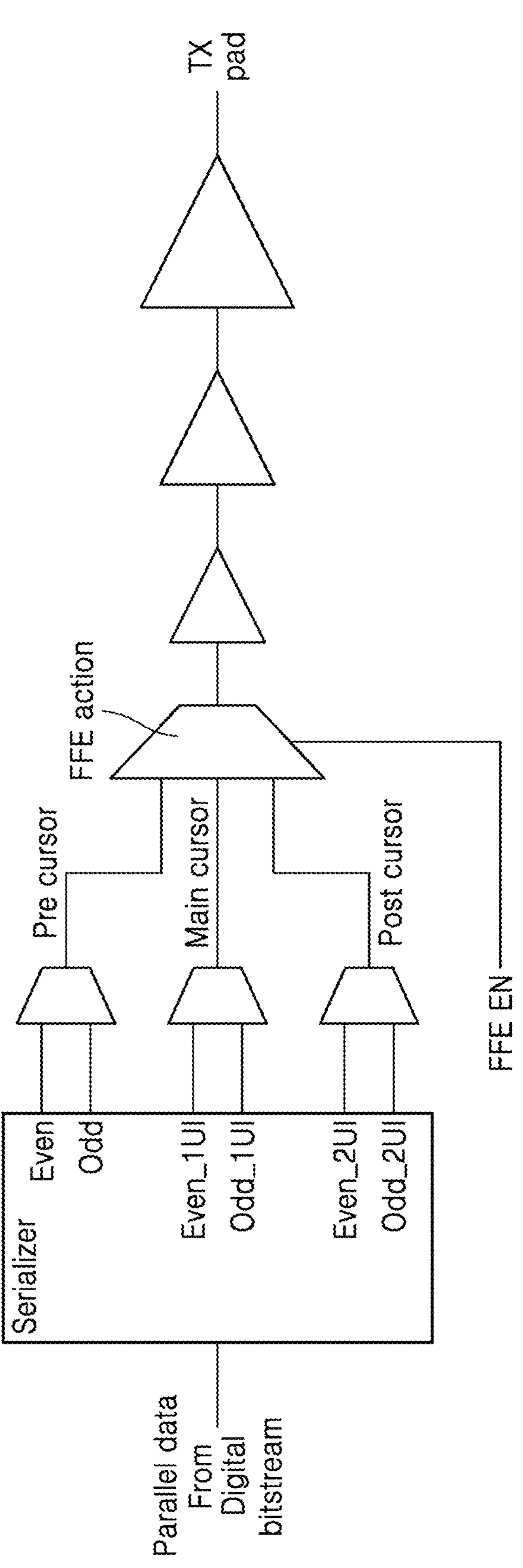
FIG. 2 illustrates a layout of a transmitter with an FFE enable signal (without FFE sync), according to a comparative example from a related art.
Figure 3:
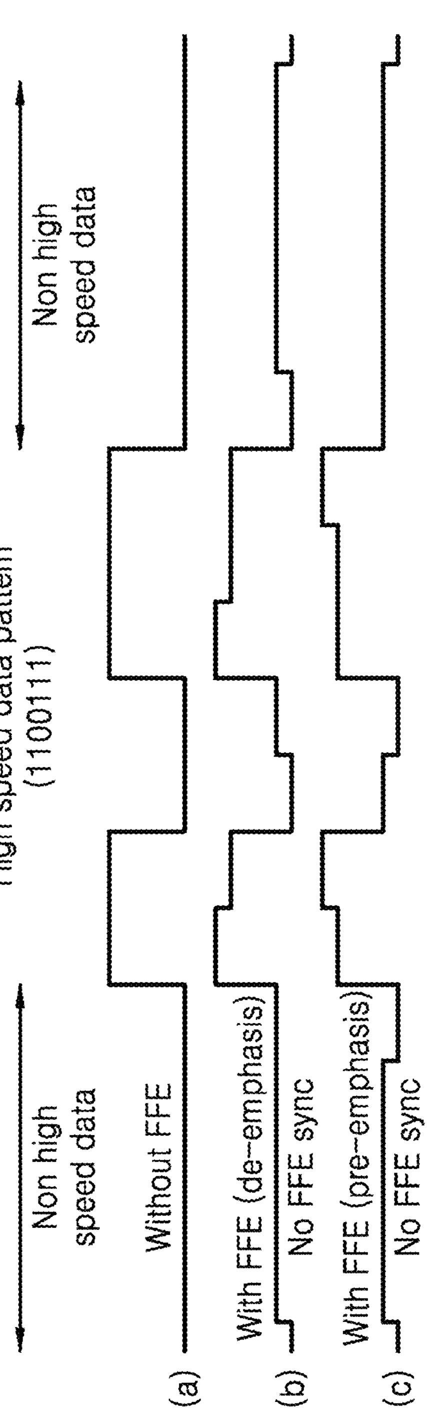
FIG. 3 illustrates FFE waveforms, according to a comparative example from a related art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

For the purposes of interpreting this specification, the definitions (as defined herein) will apply and whenever appropriate the terms used in singular will also include the plural and vice versa. It is to be understood that the terminology used herein is for the purposes of describing particular embodiments only and is not intended to be limiting. The terms "comprising", "having" and "including" are to be construed as open-ended terms unless otherwise noted.

The words/phrases "exemplary", "example", "illustration", "in an instance", "and the like", "and so on", "etc.", "etcetera", "e.g.,", "i.e.," are merely used herein to mean "serving as an example, instance, or illustration." Any embodiment or implementation of the present subject matter described herein using the words/phrases "exemplary", "example", "illustration", "in an instance", "and the like", "and so on", "etc.", "etcetera", "e.g.,", "i.e.," is not necessarily to be construed as preferred or advantageous over other embodiments.

Embodiments herein may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by a firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. However, the disclosure is not limited thereto, and as such, the blocks, which may be referred to herein as managers, units, modules, or the like, may be software modules implemented by software codes, program codes, software instructions, or the like. The software modules may be executed on one or more processors.

It should be noted that elements in the drawings are illustrated for the purposes of this description and ease of understanding and may not have necessarily been drawn to scale. For example, the flowcharts/sequence diagrams illustrate the method in terms of the steps required for understanding of aspects of the embodiments of the disclosure. Furthermore, in terms of the construction of the device, one or more components of the device may have been represented in the drawings by conventional symbols, and the drawings may show only those specific details that are pertinent to understanding the present embodiments so as not to obscure the drawings with details that will be readily apparent to those of ordinary skill in the art having the benefit of the description herein. Furthermore, in terms of the system, one or more components/modules which comprise the system may have been represented in the drawings by conventional symbols, and the drawings may show only those specific details that are pertinent to understanding the present embodiments so as not to obscure the drawings with details that will be readily apparent to those of ordinary skill in the art having the benefit of the description herein.

The accompanying drawings are used to help easily understand various technical features and it should be understood that the embodiments presented herein are not limited by the accompanying drawings. As such, the present disclosure should be construed to extend to any modifications, equivalents, and substitutes in addition to those which are particularly set out in the accompanying drawings and the corresponding description. Usage of words such as first, second, third etc., to describe components/elements/steps is for the purposes of this description and should not be construed as sequential ordering/placement/occurrence unless specified otherwise.

According to an aspect of the disclosure, one or more embodiments may include an apparatus, a method and system for eliminating glitches in the FFE by moving the FFE enable to the half rate data domain. In this manner, FFE transition glitch can be filtered at a final 2-to-1 serializer (also referred to herein as a second serializer). Moreover, one or more embodiments may include an apparatus, a method and system for creating a latency in FFE enable so that FFE is turned ON/OFF exactly at a high speed data boundary at TX pads. For example, the latency may be created by moving the FFE enable to a half rate data domain. Here, the latency may be equal to high speed data latency.

Referring now to the drawings, in FIGS. 4 through 8, similar reference characters denote corresponding features consistently throughout the figures.

Figure 4:
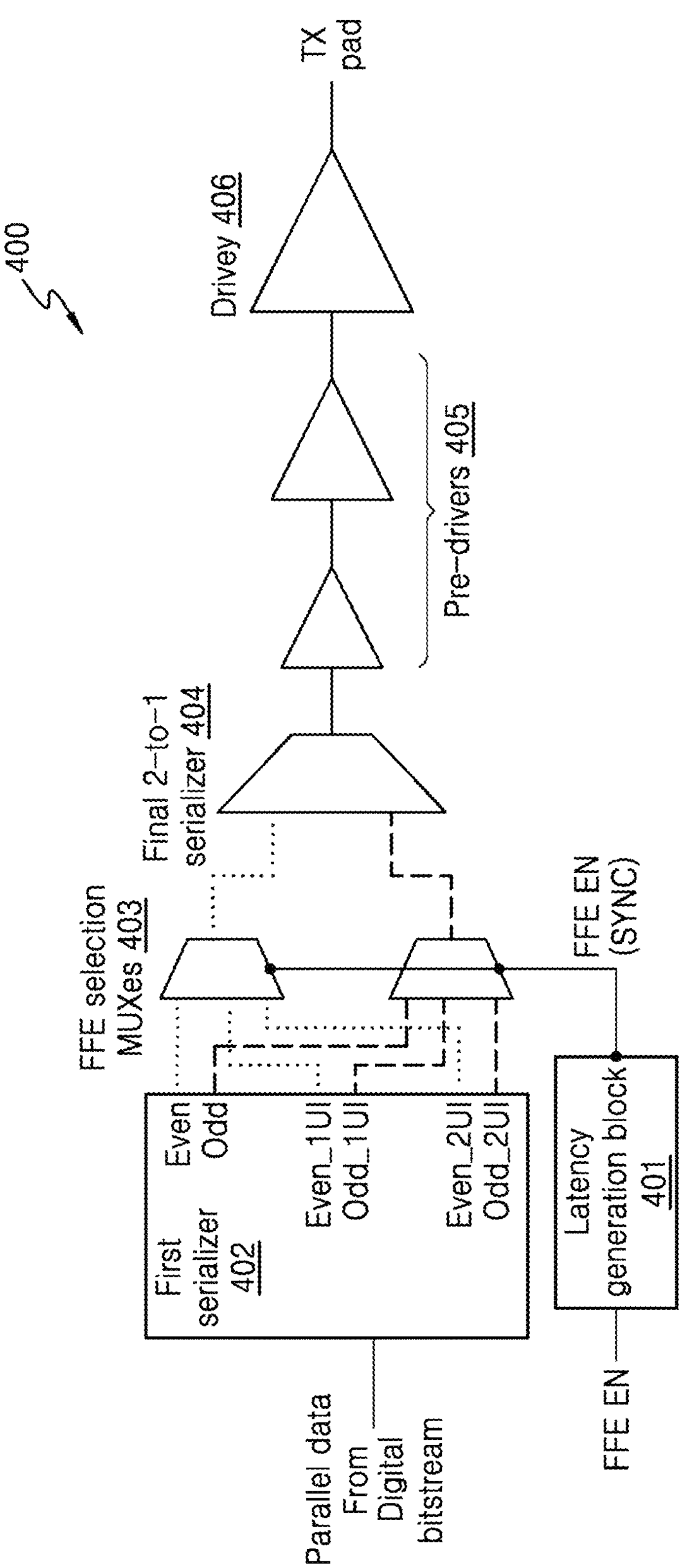
FIG. 4 illustrates a layout of a transmitter with an FFE enable signal, according to an example embodiment.

FIG. 4 illustrates an example layout of a transmitter with an FFE enable signal according to an embodiment of the disclosure. For example, the FFE enable signal is synchronized with a data domain. FIG. 4 illustrates a transmitter part of a SeDes system. Referring to FIG. 4, the transmitter 400 may include a latency generation block 401, a first serializer 402, a plurality of FFE selection multiplexers (MUXes) 403, a final 2-to-1 serializer 404, one or more pre-drivers 405, and a driver 406. The first serializer 402 may be a half-serializer, which is configured to operate in a half rate data domain. The latency generation block 401 may create a latency in FFE enable signal. For example, the latency created in the latency generation block 401 may track a high speed data latency in the first serializer 402. According to an embodiment, the FFE enable signal may toggle with input parallel data. The input parallel data may be digital data and may be given as input to the first serializer 402.

The first serializer 402 may convert the input parallel data into half-rate data domain. For example, the first serializer 402 may convert the input parallel data into even or odd data (i.e., 2 bits—even/odd). The latency, which is equal to latency at the first serializer 402, may be implemented in the latency generation block 401 using a combination of flip-flops/latches operating based on a plurality of clocks. The combination of flip-flops/latches for implementing the unit interface (UI) in the latency generation block 401 may be selected based on the clock loading and timing closure. For example, the high speed clocks should get lower loading.

Figure 5A:
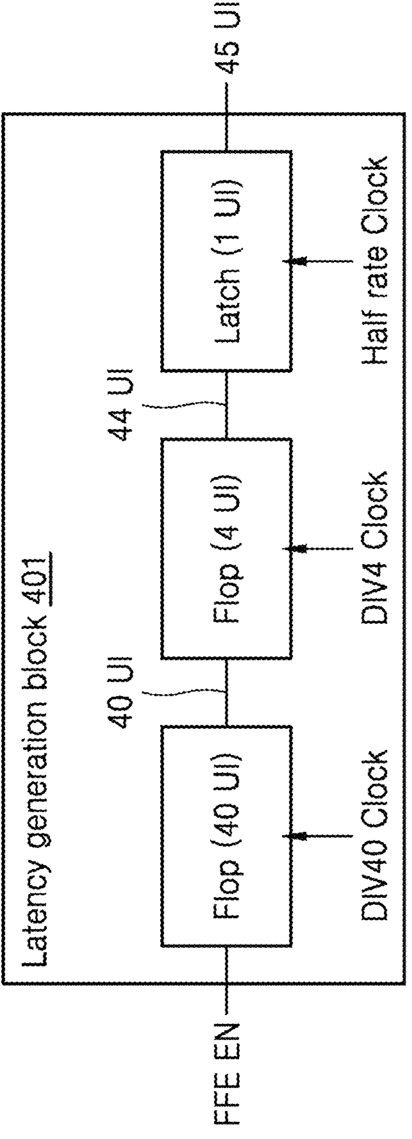
FIGS. 5A and 5B illustrate an example latency generation blocks for implementing a 45 UI latency, according to an example embodiment.
Figure 5B:
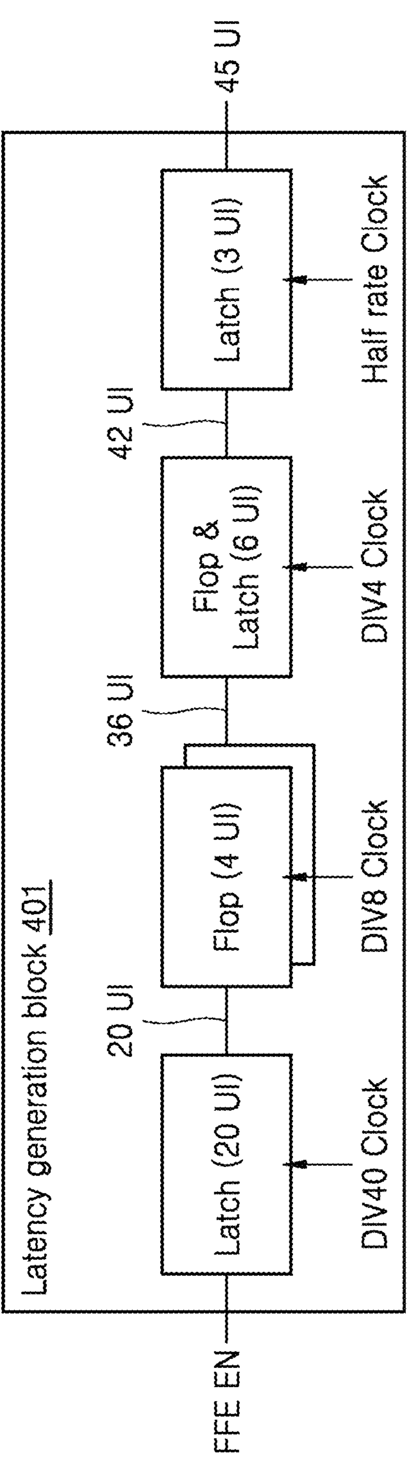

According to an example, the serializer input parallel data input width may be 40 bit. The first serializer 402 may convert 40 bits to a half rate domain (i.e., 2 bits-even/odd). The latency of the first serializer (which may be a 40-to-2 serializer) 402 is 45 UI. The half rate clock period is 2 UI. Here, the 45 UI latency means that the first serializer 402 takes 45 UI to convert the input parallel data to even/odd data. According to an embodiment, the same 45 UI may be implemented in the latency generation block as well using a combination of flip-flops/latches operating based on different clocks. For example, the first serializer 402 may use a DIV 40 clock and a half rate clock. For example, the DIV 40 clock may be obtained by dividing a clock period 40 UI by 20 of a half rate clock. According to another embodiment, the first serializer 402 may use DIV 8 and DIV 4 clocks. For example, the serialization operation may be 40-to-8 followed by 8-to-4 followed by 4-to-2. For example, the serializer architecture may determine the configuration of the divided clocks. The 45 UI latency may be implemented in the latency generation block 401 in various manner. For example, FIGS. 5A and 5B illustrate two implementations of the 45 UI latency in the latency generation block 401. However, the disclosure is not limited thereto, and as such, the latency generation block 401 may be implemented in another manner.

According to an embodiment, as illustrated in FIG. 5A, the latency generation block 401 may generate a 40 UI latency by a flop driven by the DIV 40 clock, followed by 4 UI generated by a flop driven by a DIV4 clock, and further followed by 1UI generated by a latch driven by the half rate clock.

According to another embodiment, as illustrated in FIG. 5B, the latency generation block 401 may generate a 20 UI latency by a latch driven by the DIV 40 clock, followed by 16 UI generated by 2 flops driven by a DIV8 clock, followed by 6 UI generated by a flop and latch driven by the DIV4 clock, and followed by 3 UI generated by a latch driven by the half rate clock.

Referring to FIGS. 5A and 5B, the latency generation block 401 of FIG. 5A may be considered to be better than the latency generation block 401 of FIG. 5B in terms of clock loading since only one latch loading on the half rate clock is provided in the latency generation block 401 of FIG. 5A. However, the latency generation block 401 in FIG. 5A may be considered to be worse than the latency generation block 401 of FIG. 5B in terms of close timing with just one latch in the latency generation block 401 in FIG. 5A. On the other hand, the latency generation block 401 in FIG. 5B may be considered to be better than the latency generation block 401 of FIG. 5A in terms of to close timing because of the use of a flop and latch in the latency generation block 401 in FIG. 5B. However, the latency generation block 401 of FIG. 5B may be considered to be worse than the latency generation block 401 of FIG. 5A in terms of clock loading since there is more load on the half rate clock (e.g., one flop and one latch) in the latency generation block 401 in FIG. 5B. The optimal configuration of the latency generation block 401 may be selected based on the required speed and process. That is, the optimal configuration of the latency generation block 401 may be implementation specific.

Figure 6:
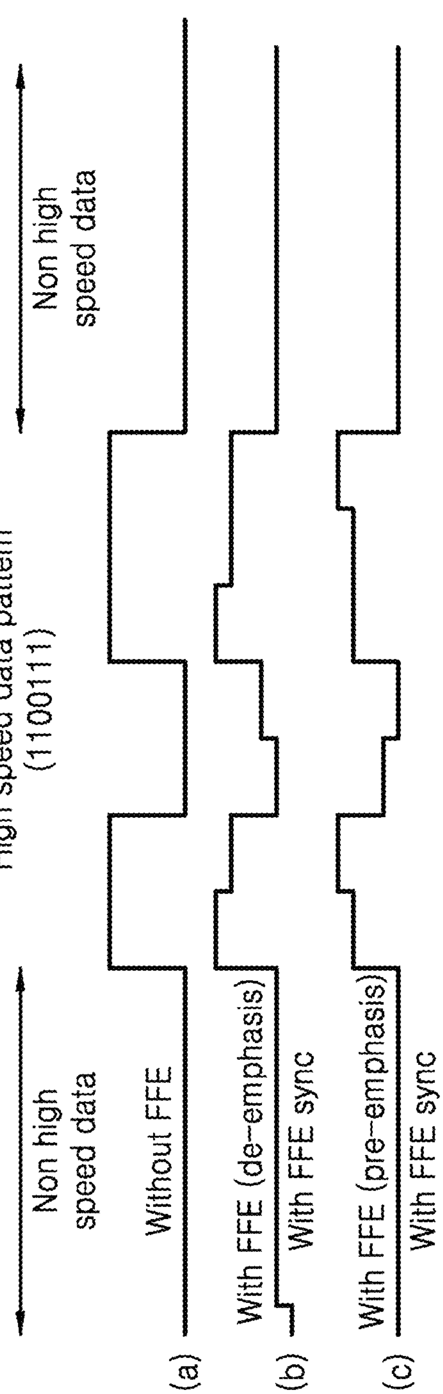
FIG. 6 depicts example FFE waveforms, according to an example embodiment.
Figure 7:
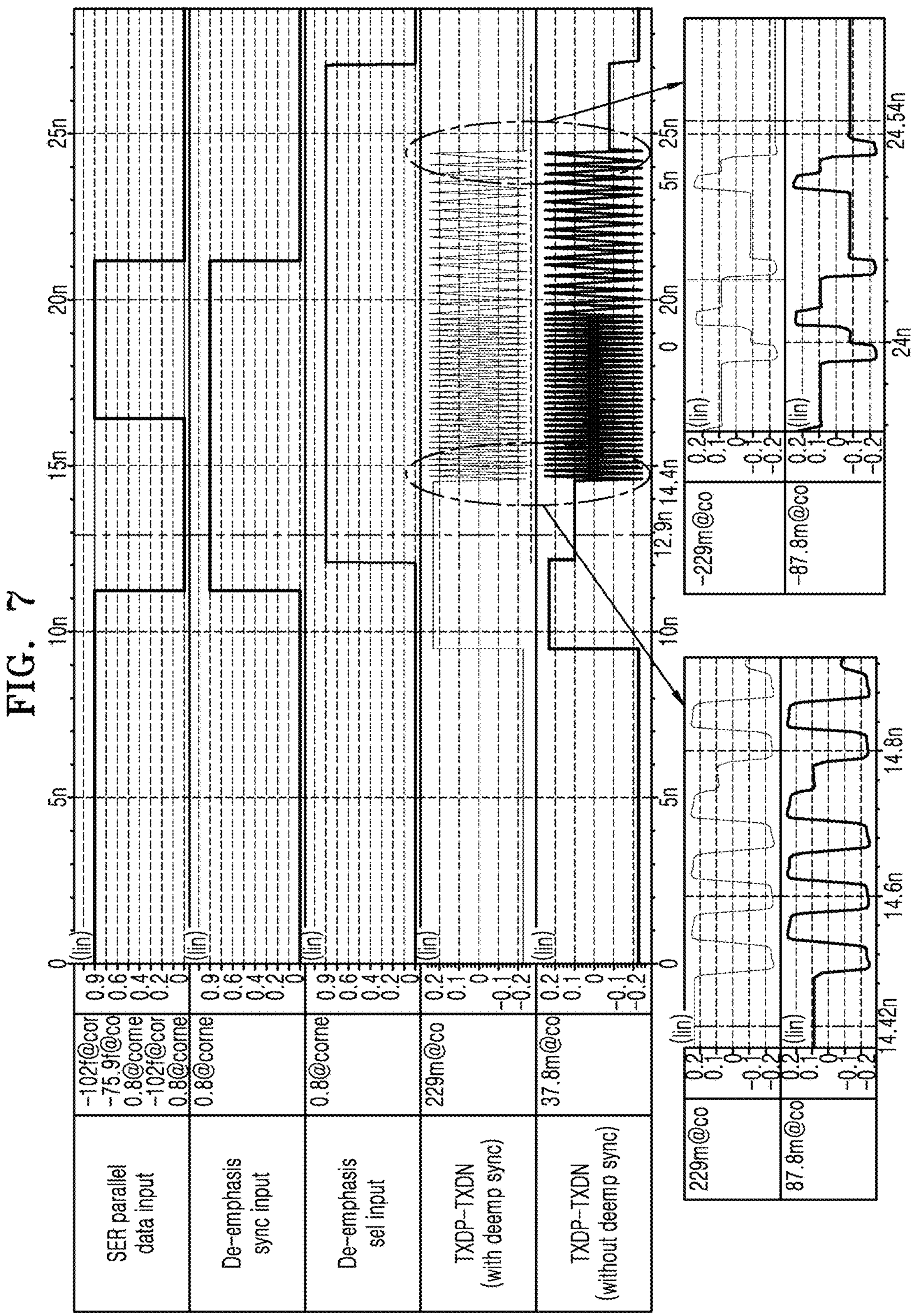
FIG. 7 depicts example simulation results, according to an example embodiment.

The transmitter 400 may filter glitches generated at the FFE selection MUXes 403 at the final 2-to-1 serializer 404 using a half rate clock. For example, the FFE selection may be moved to the half rate domain by the first serializer 402. The FFE enable may be synchronized to the half rate domain by replicating an entire serializer latency (by the latency generation block 401) on to the FFE enable path. FIGS. 6 and 7 illustrate example waveforms in which FFE sync is applied. Accordingly, the number of transistor TX IO pads may be reduced.

According to an embodiment, the synchronized FFE may eliminate false detection in receiver squelch circuits. According to an embodiment, the latency of FFE enable may be programmed as per the system requirements. According to an embodiment, the transmitter 400 with the FFE sync feature may have a negligible power overhead. According to an embodiment, the transmitter 400 with the FFE sync feature may not add any significant loading on Serializer clocks. One or more embodiment of the disclosure may simplify the pre-driver path so that the intrinsic jitter can be minimized. For example, the intrinsic jitter may be data-dependent jitter (DDJ). According to an embodiment, the transmitter 400 with the FFE sync feature may have no impact on a high speed path layout (non-slew data path) as the FFE enable latency generation block may be placed apart.

Figure 8:
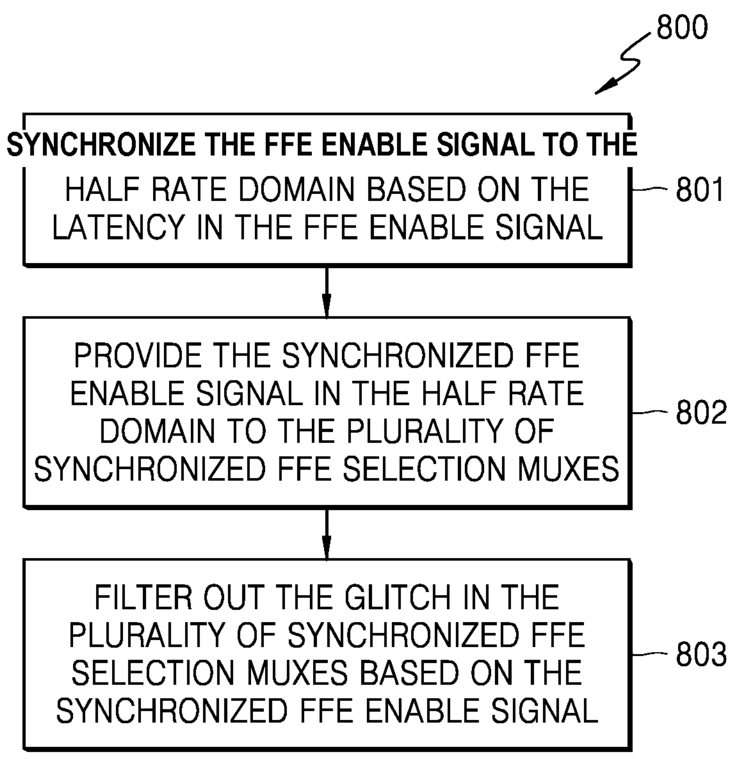
FIG. 8 depicts a method of filtering out a glitch in the serializer/deserializer (SerDes) transmitter, according to an example embodiment.

FIG. 8 depicts a method of filtering out a glitch in the serializer/deserializer (SerDes) transmitter. Referring to FIGS. 4 and 8, in step 801, the SerDes transmitter 400 synchronizes the FFE enable signal to the half rate domain based on the latency in the FFE enable signal. The latency in the FFE enable signal may be created by the latency generation block 401. the latency is equal to a latency in the first serializer 402, which is configured to serialize input data. According to an embodiment, the FFE enable signal may toggle with input parallel data. The input parallel data may be digital data and may be given as input to the first serializer 402. The first serializer 402 may convert the input parallel data into half-rate data domain. For example, the first serializer 402 may convert the input parallel data into even or odd data (i.e., 2 bits—even/odd). The latency may be implemented in the latency generation block 401 using a combination of flip-flops/latches operating based on a plurality of clocks. In step 802, the SerDes transmitter 400 provides the synchronized FFE enable signal in the half rate domain to the plurality of synchronized FFE selection multiplexers (MUXes) 403. In step 803, the SerDes transmitter 400 filters out the glitch in the plurality of synchronized FFE selection MUXes 403 based on the synchronized FFE enable signal. The SerDes transmitter 400 filters out the glitch by serializing the selected odd and even data; and transmitting the serialized data through a transmission pad. The various actions in method 800 may be performed sequentially, in a different order, or even simultaneously. Further, in some embodiments, some actions listed in FIG. 8 may be omitted.

According to an embodiment, the FFE sync feature may be integrated in transmitters easily as changes are not required in analog-digital interface timing, and the serializer timing constraints.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments and examples, those skilled in the art will recognize that the embodiments and examples disclosed herein can be practiced with modification within the scope of the embodiments as described herein.

What is claimed is:

1. A serializer/deserializer (SerDes) transmitter comprising:

a latency generation circuit configured to:

synchronize a feed forward equalization (FFE) enable signal to a half rate domain based on a latency in the FFE enable signal, the latency being equal to a latency in a first serializer configured to serialize input data; and provide the synchronized FFE enable signal in the half rate domain to a plurality of synchronized FFE selection multiplexers (MUXes); and a 2-to-1 serializer circuit configured to filter out a glitch using the synchronized FFE enable signal in the half rate domain in the plurality of synchronized FFE selection MUXes based on the synchronized FFE enable signal.

2. The SerDes transmitter according to claim 1, wherein the plurality of synchronized FFE selection MUXes are configured to select one of a pre-cursor, a main cursor and a post-cursor even and odd data from the input data serialized by the first serializer.

3. The SerDes transmitter according to claim 2, wherein the 2-to-1 serializer circuit is further configured to:

serialize the selected odd and even data; and transmit the serialized data through a transmission pad.

4. The SerDes transmitter according to claim 1, wherein the latency generation circuit has a same Unit Interval (UI) as the first serializer, and wherein the UI is implemented using a combination of one or more flip-flops and one or more latches.

5. The SerDes transmitter according to claim 4, wherein the combination of the one or more flip-flops and the one or more latches is selected based on clock loading and timing closure.

6. A method of filtering out a glitch in a serializer/deserializer (SerDes) transmitter, the method comprising:

synchronizing a feed forward equalization (FFE) enable signal to a half rate domain based on a latency in the FFE enable signal, the latency being equal to a latency in a first serializer configured to serialize input data;

providing the synchronized FFE enable signal in the half rate domain to a plurality of synchronized FFE selection multiplexers (MUXes); and filtering out a glitch in the plurality of synchronized FFE selection MUXes based on the synchronized FFE enable signal.

7. The method according to claim 6, further comprises:

selecting, by the plurality of synchronized FFE selection MUXes, one of a pre-cursor, a main cursor and a post-cursor even and odd data from the input data serialized by the first serializer.

8. The method according to claim 7, wherein the filtering out the glitch comprises:

serializing the selected odd and even data; and transmitting the serialized data through a transmission pad.

9. An apparatus comprising:

a first serializer configured to serialize input data;

a latency generation circuit configured to output a synchronized feed forward equalization (FFE) enable signal based on a latency in the FFE enable signal;

a plurality of synchronized FFE selection multiplexers (MUXes) enabled based on the synchronized FFE enable signal; and a second serializer circuit configured to filter an output of the plurality of synchronized FFE selection MUXes by moving the FFE enable signal to a half rate data domain.

10. The apparatus according to claim 9, wherein the latency generation circuit has a same Unit Interval (UI) as the first serializer, and the UI is implemented using a combination of one or more flip-flops and one or more latches, and wherein the combination of the one or more flip-flops and the one or more latches is selected based on clock loading and timing closure.

* * * * *